United States Patent Office 3,332,806
Patented July 25, 1967

3,332,806
PALLADIUM-SILVER ALLOY MEMBRANE AND METHOD OF CONSTRUCTING THE MEMBRANE
Samuel H. Teller, Manchester, and Thomas E. Scates, East Hartford, Conn., assignors to United Aircraft Corporation, East Hartford, Conn., a corporation of Delaware
No Drawing. Filed Sept. 30, 1965, Ser. No. 491,870
6 Claims. (Cl. 136—120)

This invention relates to improved electrodes for use in an electrochemical device such as a fuel cell, their method of preparation and to the electrochemical device employing such electrodes. More particularly, the invention embraces the fabrication of thin, high strength palladium-silver alloy hydrogen diffusion membranes. For convenience, thereinafter the invention will be described with emphasis being placed on the use of the membrane as a hydrogen diffusion fuel cell anode. It will be apparent, however, that the high strength palladium-silver alloy membranes of the invention can be employed in other electrochemical devices where similar considerations apply.

The advantages of non-porous palladium-silver alloy hydrogen diffusion fuel cell electrodes are described in the art; for example, Oswin, U.S. Patent No. 3,092,517. Such electrodes permit the use of impure hydrogen streams and a free-flowing electrolyte without the usual problems such as flooding of electrode or bubbling or reactant through the electrodes as in conventional fuel cells employing porous electrodes. Additionally, since the electrodes are light in weight, a high energy to density battery can be obtained. However, while highly advantageous and desirable as fuel cell electrodes, it has been found that membranes constructed of such an alloy undergo expansion at high temperatures, due to hydrogen adsorption. Repeated hydrogen adsorption and desorption cycles induce stresses in thin unsupported membranes, which stresses eventually may cause structural failure. Expansion of the membranes can also cause electrical shorts as a result the expanded electrode touching a conductive surface. Moreover, the expansion of the membrane presents sealing problems.

A solution to the aforesaid problem comprises the attachment of a support grid to the membrane which allows for a suitable ratio of supported to unsupported area. Such a grid must leave a maximum membrane open surface area available for hydrogen adsorption and diffusion. The present invention provides a fabricated support structure which has the necessary high structural strength without affecting membrane electrochemical and diffusion properties. Accordingly, electrodes are fabricated from extremely thin Pd-Ag alloy foils, thereby reducing electrode cost and increasing permeability for a given unit area. The electrodes are obtained by bonding a very thin palladium-silver alloy foil to a nickel support screen. More specifically, a nickel support screen or grid is coated with a thin film of gold, and thereafter the screen and foil are compressed and while under compression sintered in an inert atmosphere. The bonding technique allows inter-diffusion of gold, palladium-silver alloy, and nickel providing a very high strength and uniform joint. The bond has high mechanical strength, low electrical resitivity, and good chemical compatibility with bond components and environmental gases such as wet hydrogen and reforming products. Moreover, the coefficient of expansion of the various bond components is substantially the same providing a stable structure. The hydrogen diffusion characteristics and electrochemical activities of the membrane are not impaired.

Having described the invention in general terms, the following detailed working example is set forth:

*Example*

A screen of 0.005" outside diameter nickel wire with 80 percent open area and a 0.0008" thick palladium-silver alloy membrane was degreased in trichloroethylene. Thereafter, the screen and membrane was vapor-blasted with 325 grit $Al_2O_3$ at 7 p.s.i. and rinsed with demineralized water. The screen was electroplated with gold employing a conventional electrochemical technique to provide a 0.001" thick coating on the screen. The screen and membrane were sandwiched between two flat graphite blocks and loaded with a ten pound weight. The sandwich was then subjected to a heat treatment at 1700° F. for one hour in a helium atmosphere. Thereafter, the structure was allowed to slowly cool in the helium atmosphere.

The resultant structure was a thin, high strength palladium-silver membrane with the nickel support screen uniformly bonded to the membrance. The bond demonstrated excellent uniformity and was homogeneous. The structure fabricated by the above process was cycled (adsorption and desorption of hydrogen gas) at 400 to 500° F. over 100 hours without structural failure. Nickel screens when bonded to a palladium-silver alloy membrane by conventional techniques will not withstand the aforesaid cycling without breaking away of the palladium-silver membrane from the support or cracking of the membrane.

Although the time and temperature of the heat treatment are inter-related, and thus subject to some variation, it is essential that the time and temperature be controlled to provide allowable bond penetration and interdiffusion. Moreover, in order to have utility as a hydrogen diffusion electrode, it is essential as noted hereinbefore that the exposed surface area of the membrane remain as large as possible. Since the amount of hydrogen transported per unit time is inversely proportional to membrane thickness and directly proportional to membrane area, the exact point where it ceases to be an advantage to use a thin, supported membrane in place of a thick, unsupported membrane can be calculated from Fricks' Law which states:

$$N = \frac{DA}{L} \frac{(P_1 - P_2)}{RT}$$

where

N = Moles of $H_2$
D = Diffusivity constant for palladium silver
A = Area of membrane
L = Thickness
R = Universal gas constant
T = Temperature
P = Partial pressure of hydrogen on each side of membrane Referring to the structure of the example, assuming for comparison that a 0.0015" thick membrane may be used in an unsupported condition, then the 20 percent loss in open area for the example given is more than offset by the approximately 50 percent decrease in membrane thickness. In addition to having increased permeability, the support electrode of the example is not subject to structural failures as are the unsupported electrodes and present no problem of possible damage due to the expansion of the electrode. As a rule of thumb, the nickel support grid or screen preferably will comprise from 60 to 90 percent open area. The gold coating on the nickel support, which is preferably applied by electro-plating, but can be laid down by chemical application, or other means, will preferably have a thickness of from about 0.0001 to 0.015 inch. The palladium-silver alloys employed herein contain from about 5 to 40 percent by weight silver. Such alloys have been demonstrated to be sufficiently permeable to hydrogen for use as a fuel cell electrode and possess the necessary electrochemical activity. Alloys containing from about 25 percent silver and 75 percent palladium have been shown to have optimum fuel cell characteristics, primarily from the standpoint of electrochemical activity and provide an optimum bond. The thickness of the membranes preferably will range from about 0.0001″ thick up to about 0.001″ thick. The selection of the particular membrane will depend upon its ultimate application.

As will be apparent to one skilled in the art, the illustrative example is only set forth as a working embodiment of the invention. The invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices and as a hydrogen separator in a purification unit.

It is claimed:

1. A method of constructing a high strength palladium-silver alloy membrance comprising coating a nickel grid-like support with a thin layer of gold, contacting said coated nickel grid and a thin palladium-silver alloy membrane under pressure and while maintaining said pressure heating at a temperature sufficient to bond said coated nickel support and said palladium-silver alloy membrane.

2. The method of claim 1 wherein the palladium-silver alloy comprises 75 percent palladium and 25 percent silver.

3. The method of claim 2 wherein the layer of gold is applied to the nickel support grid by electro-plating.

4. A method of fabricating a high strength palladium-silver alloy membrane comprising the steps of coating a nickel support screen having an open area of from about 60 to 90 percent with a coating of gold having a thickness of from about 0.0001 to 0.015″ contacting said nickel support with a palladium-silver alloy membrane comprising from 5 to 40 percent silver under pressure and heating said support and membrane while in contact under pressure at a temperature sufficient to inter-diffuse the gold layer, palladium-silver alloy membrane, and nickel grid.

5. The method of claim 4 wherein the palladium-silver alloy comprises 75 percent palladium and 25 percent silver.

6. A thin, high strength palladium-silver membrane comprising a palladium-silver alloy membrane bonded to a gold coated nickel support screen by means of an inter-diffused bond of gold, palladium-silver alloy, and nickel.

References Cited
UNITED STATES PATENTS

| | | | |
|---|---|---|---|
| 2,773,561 | 12/1956 | Hunter | 136—186 |
| 3,020,327 | 2/1962 | Ruetschi | 136—120 |
| 3,092,517 | 6/1963 | Oswin | 136—120 |
| 3,116,170 | 12/1963 | Williams et al. | 136—86 |

WINSTON A. DOUGLAS, *Primary Examiner.*

A. SKAPARS, *Assistant Examiner.*